Patented June 13, 1944

2,351,149

UNITED STATES PATENT OFFICE 2,351,149

PLASTIC COMPOUND

Marc de Becker Remy, Detroit, Mich.

No Drawing. Application April 28, 1941,
Serial No. 390,745

1 Claim. (Cl. 260—747)

This invention relates to plastic compounds and particularly to a plastic compound in which proteins may constitute the principal ingredient, the principal object being the provision of a compound of this type that is easily and cheaply manufactured and has improved characteristics particularly for certain uses.

Objects of the invention include the provision of an improved plastic compound comprising proteins and one or more materials of a class consisting of wheat gluten, casein, and rubber; the provision of a plastic compound comprising soya bean protein and one or more materials of a class consisting of wheat gluten, casein, and rubber; the provision of a plastic compound comprising proteins and one or more materials of a class consisting of wheat gluten, casein, and rubber, and in which the proteins comprise at least 75% by weight of the total weight of the compound; the provision of a plastic compound comprising proteins and gluten and in which the gluten is present in amounts equal to from 5% to 25% of the total weight of the compound; the provision of a plastic compound comprising proteins and casein and in which the casein is present in amounts from traces up to 15% by weight of the weight of the compound; and the provision of a plastic compound comprising protein and rubber and in which the rubber is present in amounts from a trace up to 2% of the total weight of the compound.

Other objects of the invention include the provision of a method of forming a plastic protein compound of improved character; the provision of a method of making a plastic protein compound including proteins and one or more additional materials compounded therewith and acting as a plasticizer for the proteins; the provision of a method of making a plastic compound comprising proteins and one or more materials of a group consisting of wheat gluten, casein, and rubber, and in which all of the materials of the compound are arranged in dissolved condition to form an intimate mixture and are then coagulated from the solution to form the desired compound; the provision of a method of making a plastic protein compound as above described in which each of the above described materials going to make up the compound is provided in a separate alkaline solution, the alkaline solutions are mixed together, and then the materials coagulated as a mass to form the desired compound; the provision of a method of making a plastic protein compound as above described in which certain additional materials are added to the solution prior to coagulation to impart certain additional characteristics to the final compound; and the provision of a method of making an improved plastic protein compound comprising mixing together protein and one or more materials of a class consisting of wheat gluten, casein, and rubber, in the form of small particles, and then molding the resulting mass and treating the molded product with an aldehyde.

The above being among the objects of the present invention, the same consists in certain novel plastic compounds and in certain novel steps of operation in producing the same, to be hereinafter described, and then claimed, having the above and other objects in view.

The use of proteins as a plastic material is well understood in the art. Proteins may be obtained in a relatively simple manner by suitably treating certain grains. As a matter of illustration, it may be obtained by treating the flour or meal made from soya beans, rice, or Indiana corn, and from which the oil has been abstracted, with a suitable alkali solution, such as a 0.1% to 0.5% sodium hydroxide solution, which will dissolve the protein content of the flour or meal and the resulting solution may then be filtered or otherwise purified and treated with an acid to precipitate the protein content, which may thereafter be dried or otherwise conditioned for use.

Most of the plastic compositions heretofore made from proteins have had a relatively limited use due to their brittle nature, rendering them difficult to work under certain conditions and resulting in products unsuitable for certain uses.

It is the object of the present invention to produce a new plastic compound consisting principally of proteins having combined therewith a material which will act in the nature of a plasticizer and which will chemically combine therewith to provide a new compound rather than a mixture. I have found that by adding suitable amounts of either wheat gluten, casein, or rubber, or a combination of these materials, to a protein, a resulting compound is obtained of improved characteristics as compared to protein plastics heretofore produced. These new compounds have more ductility than straight protein compounds, are more flexible, and may be molded better and easier than straight protein plastics. I have found that protein and wheat gluten may be employed to form a compound in which the wheat gluten is present in amounts from 5% to 25% of the total weight of the compound and produce a very desirable result. I have also found that a compound comprising protein and casein may be produced and in which the casein is present from a trace up to 15%, resulting in a compound of improved characteristics. I have further found that a compound of protein and rubber may be produced in which the rubber is present in amounts from a trace up to 2%, also resulting in a compound having many favorable characteristics. In the latter case, it is desirable to introduce a small amount of sulphur in order to enable the resulting compound to be vulcanized in much the same way as straight rubber compounds. Compounds consisting of proteins and two or more of the remaining materials, each present in approximately the proportions stated, may likewise be produced and found useful.

In the broader aspects of the invention, the compound may be formed in any suitable manner. For instance, the various materials may be dissolved so as to form a common solution of all of the materials and then be simultaneously precipitated or coagulated to produce the desired compound. This method is preferable inasmuch as each of these materials is capable of being provided in an alkaline solution and in such case they may be dissolved together in a single solution or else dissolved separately, the various solutions mixed together, and then the materials therein precipitated or coagulated. The particles of the material thus precipitated or coagulated fuse together during the precipitation or coagulation and result in a true compound as differentiated from a mixture. After precipitation or coagulation, the resulting mass is filtered to extract the water, dried, then molded to the desired shape or size with or without the addition of inert filler materials and/or suitable coloring pigments and/or agents, and then treated with an aldehyde such as formaldehyde to harden it.

The manufacture of the compound by providing a separate solution of each and thereafter mixing desired quantities of the different solutions together is the preferred method followed in producing the compound and, accordingly, the various steps of operation following out such method will be described therein.

The protein solution is obtained in the manner above described. In other words, flour or meal made from soya beans, rice, Indiana corn, or other suitable grains, from which the oil has been abstracted, is treated with a suitable alkaline solution such as 0.1% to 0.5% sodium or potassium hydroxide to dissolve the protein compound thereof. A sodium hydroxide solution is preferably used and soya bean flour or meal is preferably employed. The resulting solution is preferably filtered or centrifugated to purify the same. The addition of a suitable acid or carbon dioxide to this solution will precipitate or coagulate the proteins.

Wheat gluten represents from 10% to 18% of the wheat, depending upon its quality or origin. It is extracted by well known wet processes from the wheat or from the wheat flour. Gluten has two chief constituents, namely, glutenin and gliadin. The gluten is the distinctive protein of wheat and occurs only in the wheat protein. Gliadin confers upon the gluten its capacity of cohering to elastic masses. Gluten has a very complicated structure, it is composed of amino acids. Its composition is approximately 53% carbon, 7% hydrogen, 15% to 18% nitrogen, and about 1% sulphur. In preparing gluten in accordance with the preferred method of the present invention, it is dissolved in a solution of sodium hydroxide or potassium hydroxide and particularly sodium hydroxide (0.1% to 0.5%) where it is to be employed in conjunction with other sodium solutions. Some ammonium hydroxide may be added to the solution depending upon the nature of the other solution or solutions with which it is to be mixed. The pH value of the solution should be watched carefully. The quantity of gluten dissolved increases the concentration of the alkalinity of the solution up to a degree of alkalinity equivalent to a pH value of approximately 13. It follows the laws of chemistry and reacts in a chemical reaction like crystaloid. If found necessary or desirable to have a pure solution the sodium glutinate may be filtered or purified by a centrifugal separator.

The casein, which may be employed in accordance with the present invention, may be obtained from any suitable source and by any suitable method. It may be obtained in substantially pure form on the open market. It is, of course, principally obtained from the dairy industry as a by-product and great quantities are available at low price. In preparing the casein in connection with the preferred method of carrying out the present invention, it is simply dissolved in a suitable alkaline solution and which, for instance, as in the case of the materials or ingredients already described, may be a solution of 0.1% to 0.5% of sodium or potassium hydroxide. It may also be dissolved in an equivalent solution of sodium carbonate.

The rubber which is used in the preferred method of the present invention is preferably employed in the form of latex. Latex is the milky juice of certain plants in which the rubber is distributed as rubber particles or rubber spheres. Additionally, latex contains a certain amount of proteins. The proteins dissolved in the serum of the juice may be coagulated and coagulates at about the same pH as does the latex. By the addition of alkalies, latex may be kept liquid for a long time. Ammonium hydroxide, sodium hydroxide, or sodium carbonate may be used as such alkali and the alkalinity of the latex must be kept high enough to prevent spontaneous coagulation if the latex is to be maintained in liquid form. The latex particles are negatively charged, so that in compounding them with positively charged particles, the latex coagulates. The coagulation of latex may be effected by acids. Acetic acid, hydrochloric acid, or nitric acid may be used, and it is to be noted that the strong acids coagulate the latex completely. It is the latex in liquid form in an alkaline condition that is employed in connection with the preferred method of the present invention.

The latex or rubber elements of the compound of the present invention may include a minor proportion of reclaimed rubber under certain conditions. This is particularly so where the various elements or ingredients are dried and ground and thoroughly mixed together and then molded under heat and pressure, particles of reclaimed rubber being capable of being intermixed with such mixture as will readily be appreciated. It may also be mixed with any of the compounds produced according to the preferred method of the present invention after they have been dried and ground. Where incorporated as a part of an alkaline solution, miscible with the other solutions under consideration, it may also be added in dissolved form. Accordingly, it will be understood that in the broader aspects of the present invention, the term "latex" and "latex solutions" are intended to be interpreted broadly enough to include reclaimed rubber in solid form or in solution as the case may be.

In following out the preferred method, in accordance with the present invention, the protein and the other materials or materials of a class consisting of wheat gluten, casein, and latex, are each separately converted into alkaline solution. Preferably, these solutions are standard solutions, that is, each contains a predetermined amount of the material dissolved so as to facilitate the mixing of correct amounts of each to produce a final product having the desired proportions of each material. The alkalinity of all of the solutions is preferably brought to approximately the same pH value and the temperature of all of the solutions is preferably brought to approximately the same value, preferably in the neighborhood of 30° C. and preferably not over 50° C. The solutions are then mixed together, either by introducing them into a suitable vat or container and stirring them to effect an intimate mixture thereof or else by passing them through a siutable homogenizer or colloidal mill. Where more than two ingredients are to be employed in a compound, then the solutions of two or more of them may be mixed together and be mixed with the remaining solution or solutions if desired. As previously mentioned, the same results may be obtained by adding the dry ingredients, excepting only the latex, to a suitable alkaline solution and causing the various ingredients or elements to be dissolved in combination therein, the latex where used then being added and mixed therewith.

The solutions thus having been mixed together, or the solution of the desired materials having been otherwise produced, precipitation or coagulation of the proteins and the other material or materials is effected by the addition of suitable acid to the solution. Such acid is preferably added relatively slowly and care should be exercised by watching the pH value of the solution to prevent an excess acidity. Preferably, only slightly more acid is added than is required to insure complete coagulation or precipitation of the compound. Any suitable acid may be used for this purpose, such as sulphuric acid, hydrochloric acid, nitric acid, phosphoric acid, acetic acid, or the like, but such acid is preferably free of iron so as to avoid staining the compound. The acid may be added and thoroughly mixed with the solution or it may be added continuously while the solution is passing through the homogenizer or other suitable mill where such homogenizer or mill is employed for obtaining a homogeneous solution. Instead of employing acid to precipitate or coagulate the materials in the solution, carbon dioxide may be passed through the solution to effect the same result and is preferable, under some circumstances at least, in that it appears to result in a brighter and more lustrous product. Such carbon dioxide may be obtained from furnace or boiler gases provided such gases are suitably cooled and cleaned before application to the solution.

The proteins and other particles of the compound which are thus precipitated or coagulated, are fused together during precipitation or coagulation and form a homogeneous mass. This new compound may be hardened by the action of aldehydes, as, for instance, formaldehyde. If thus hardened, the pH value can thus be maintained relatively low, for instance, approximately at a value of 4.7, before the reaction is started. If both the aldehyde and the phenol are added, the resultant phenol condensate combines with the compound and a still different compound results which has properties that are of a superior nature for certain uses, and it is highly resistant to water. The aldehyde in such cases hardens the compound, as will be appreciated.

The compound thus precipitated or coagulated if not treated with an aldehyde to harden it, may be washed to reduce the acid content, or it may be neutralized. The coagulate is then preferably filtered, dried, in a vacuum, if necessary, and preferably at a temperature not in excess of 50° centigrade, and then ground or shredded to reduce it to a mass of relatively small sized particles. The compound may be worked pure or with the addition of artificial resin, such, for instance, as phenol, formaldehyde or other like resins.

Where the compound consists of protein and latex, or protein and latex and one or more of the other materials of the class defined, it is preferable to introduce from a trace to 0.5% of sulphur in the compound. Such sulphur may be thoroughly intermixed with the compound after it has been dried and ground or powdered, but it is preferable to add it to one of the solutions from which the compound is eventually precipitated or coagulated. The sulphur thus added may be colloidal sulphur, finely pulverized sulphur, or as sulphur bi-sulphide. However, from the standpoint of cost it is preferable to use finely ground sulphur which is preferably intimately mixed with the solutions by vigorous stirring or the like immediately before precipitation or coagulation so as to insure its even distribution in the final compound. The addition of the sulphur immediately before precipitation or coagulation is desirable for the reason that in the presence of the dissolved colloid it may have a tendency to coagulate the mixture and, accordingly, if added immediately before precipitation or coagulation such effect will not be important. The addition of the sulphur to compounds including latex is desirable in order to impart the characteristic of vulcanization to such compound. Additionally, if desired, any of the usual rubber accelerators may also be added.

The compounds resulting as above described are new compounds having specific qualities of their own. They can be molded under heat and pressure to any desired shape. Any suitable or desirable amounts of inert filler materials may be mixed with the compound prior to molding and likewise coloring pigment and/or dye material may be added to impart the desired color to the final product. The final product may be worked with conventional tools employed to work material of substantially the same degree of hardness and/or elasticity. In this last connection it will be appreciated that the characteristics of the compound in this respect will vary according to the proportion of the material or materials added to the proteins in accordance with the practices of the present invention.

On the other hand the compound may be formed into threads or fibers. This is accomplished by ejecting the mixture of the desired solution through spinnerets under pressure or gravity into a solution of any of the acids above mentioned for the purpose of effecting coagulation of the materials in the ejected solution. In such case the coagulation is preferably effected slowly and progressively and the solution after being coagulated into threads is drawn through a bath containing an aldehyde such as formaldehyde to harden the same. The formaldehyde also renders the threads insoluble. The threads or fibers thus formed may be employed for making fabrics or for any other of the usual purposes to which threads formed from natural fibers are employed.

It is to be understood that the resulting compound may consist of proteins and one or more elements of the group consisting of wheat gluten, casein and latex with or without the addition of a phenol condensate according to the desires of the manufacturer. As far as experiments thus far conducted have shown the proportion which the elements or materials of the group bear to the total weight of the compound is substantially that previously indicated although it will be appreciated that it may be possible upon further study and experimentation to find uses for compounds having different proportions of these elements.

Having thus described my invention what I claim by Letters Patent is:

A plastic compound comprising 5% to 25% by weight of wheat gluten, casein up to 15% by weight, rubber up to 2% by weight, and the balance consisting principally of proteins derived from a class of materials consisting of soya beans, rice, and maize.

MARC DE BECKER REMY.